June 13, 1933. J. A. PAVELKO 1,913,721
LAWN MOWER
Filed July 30, 1932 2 Sheets-Sheet 1

INVENTOR.
John A. Pavelko
BY
Lancaster, Allwine and Rommel
ATTORNEYS.

June 13, 1933.  J. A. PAVELKO  1,913,721
LAWN MOWER
Filed July 30, 1932   2 Sheets-Sheet 2

INVENTOR.
John A. Pavelko

Patented June 13, 1933

1,913,721

UNITED STATES PATENT OFFICE

JOHN ANDREW PAVELKO, OF COALDALE, PENNSYLVANIA

LAWN MOWER

Application filed July 30, 1932. Serial No. 626,949.

The present invention relates to lawn mowers and the primary object of the invention is to provide a lawn mower having a reciprocating cutting blade in contradistinction to the usual type of rotary cutting blade.

A further object of the invention is to provide a lawn mower of this character whereby the grass may be cut close to walls, flower beds, fences and the like, and thereby eliminate the usual task of hand trimming.

A further object resides in the novel arrangement for imparting a reciprocatory movement to the reciprocating cutter bar and the arrangement for automatically disengaging the gearing arrangement upon clogging of the cutter.

A still further object resides in the novel arrangement of tensioning means for the cutter bar, and which tensioning means permits adjustment of the cutter to prevent clogging when cutting thick or coarse grass.

A further object resides in the novel and compact arrangement of driving means for the cutter bar and the manner of enclosing the driving means beneath a shallow cover member over which the cut grass has movement during the cutting operation.

A still further object of the invention is to provide a lawn mower of the reciprocating cutting bar type which will be extremely light in weight and capable of being operated in the usual manner of operating lawn mowers of the rotating cutter type.

Other objects and advantages of the invention will be apparent during the course of the following detailed description, taken in connection with the accompanying drawings forming a part of this specification and in which drawings:—

Figure 2:
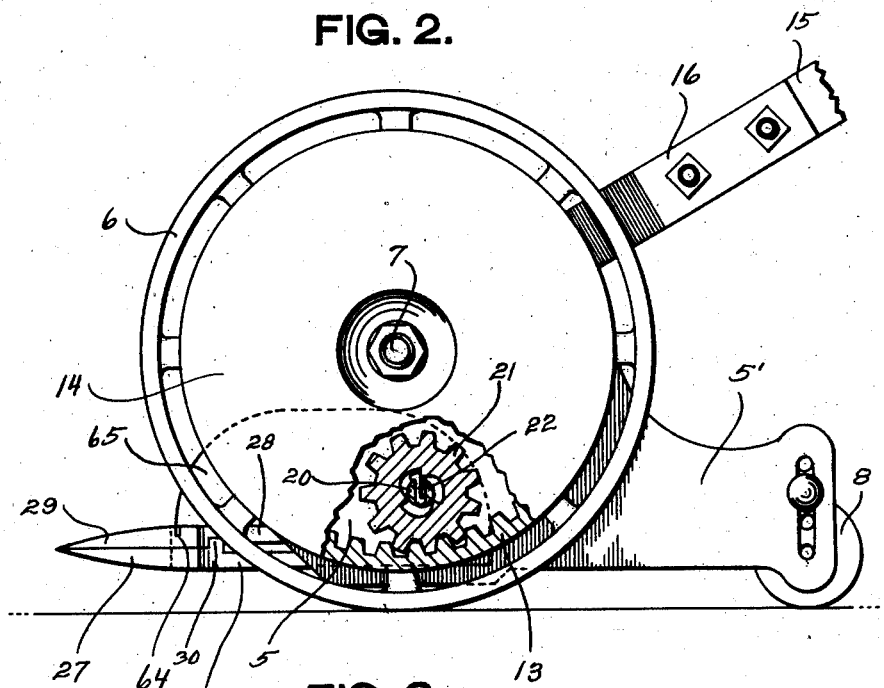
Figure 2 is an enlarged side view of the mower and showing a portion of the gear housing broken away.

Referring to the drawings in detail and wherein similar reference characters designate corresponding parts throughout the several views, the improved lawn mower comprises a frame including a pair of side plates 5 to the outer side of each of which is journaled a ground wheel 6 as upon bolts 7. These ground wheels 6 as will be observed in Figure 4 have a diameter slightly greater than the diameter of the disc-shaped portions of the side plates 5. The side plates 5 are formed with rearwardly extending portions 5' for mounting of a roller 8 as by hangers 9 vertically adjustable at the rear ends of the extensions 5'. These adjustable hangers 9 serve to vary the height at which the grass is cut.

Connecting the forward lower portions of the side plates 5 is a tie bar 10 having rearwardly turned ends 11 for attachment to the side plates as by the stud bolts 12.

Provided at the outer side of each ground wheel 6 is an internal gear 13 provided at its outer side with a cover plate 14 preferably cast integral with the gear as is usual practice. This cover plate 14 is of a diameter equal to the diameter of the disc-shaped forward portion of the side plates 5 and forms therewith a housing for the gear teeth. A handle 15 is connected by the handle braces 16 to the inner sides of the side plates 5 by the bolts 17. This handle arrangement is similar to conventional lawn mower construction, the braces 16 having limited pivotal movement on the bolts 17 by the stop lugs 18.

Suitably journaled at its ends in the side plates 5 adjacent the lower edges thereof is an operating or driving shaft 20 having its ends extending into the housings formed by the side plates 5 and cover plates 14. Freely rotatable in one direction upon the ends of the shaft 20 are pinions 21 for meshing with the teeth of the internal gears 13. These pinions 21 are connected by a pawl and ratchet arrangement 22 of any preferred type whereby rotation is imparted only in one direction to the shaft 20 by the ground wheels. This pawl and ratchet arrangement is such that the shaft 20 will be rotated upon forward travel of the ground wheels as is the usual type of lawn mower drive.

Figure 1:
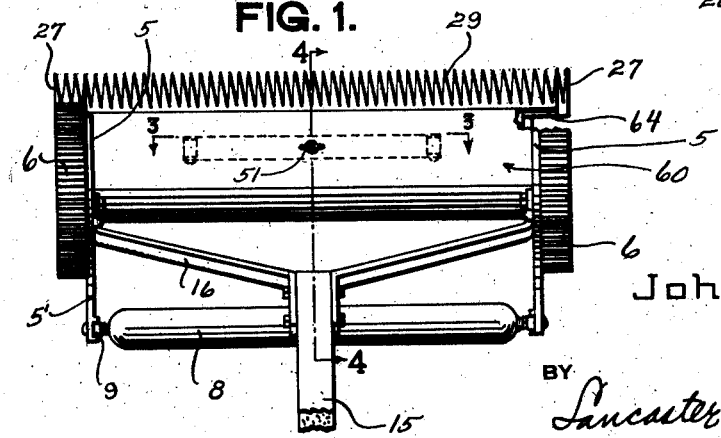
Figure 1 is a top plan view of the improved lawn mower and showing a fragmentary portion broken away for illustrating certain details of construction.

Referring now to the cutter means proper, the same embodies a lower or stationary cutter plate 25 mounted at its ends to the lower edge portion of the side plates 5 as by the angle brackets 26. As will be observed in Figure 4, the stationary cutter blade is secured adjacent its rear portion to the side plates and projects forwardly past the ground wheels 6 in closely spaced relation above the ground surface. The forward end of this cutter plate 25 is formed with a series of stationary knives 27 which extend at least to the outer edges of the ground wheels 6 as is clearly shown in Figure 1. Adapted for reciprocatory movement over the stationary cutter plate 25 is a reciprocating cutter plate 28 preferably of less width than that of the supporting or stationary cutter plate 25 and provided at its forward end with a series of cutting knives 29 adapted to co-act with the stationary knives 27 to perform the cutting operation. These cutting knives 29 have a reciprocating movement to the ends of the row of stationary knives 27 and from Figure 1 it will be seen that with this arrangement the grass will be cut for the full width of the mower. The cutter plate 28 is guided for reciprocatory movement on the cutter plate 25 by means of parallel guide ribs 30 formed on the upper side of the plate 25 and working in parallel guide grooves 31 formed in the under side of the plate 28. The open space between the guide ribs 30 is to reduce frictional contact of the plates 25 and 28.

Referring now to the driving or gearing arrangement for imparting a reciprocatory movement to the cutter plate 28 from the rotating driving shaft 20, the same embodies a bearing bracket 32 of channel or inverted U-shape and having its downturned forward end 33 secured to the medial portion of the tie bar 10 as by suitable rivets or the like 34. The downturned rear end 35 of the bracket 32 is provided with a bearing sleeve 36 the axis of which extends at a right angle to the axis of the shaft 20. Journaled in this bearing sleeve 36 is a driven or cutter reciprocating shaft 37 which is supported above the cutter plate 28 by the bracket 32. Fixed to the forward end of the shaft 37 is a pinion 38 for meshing with a rack 39 secured to the upper side of the plate 28. This rack 39 may either be formed integral with the plate 28 or secured to the plate as shown. Affixed in any preferred manner to the rear end of the shaft 37 is a beveled gear 40 adapted to mesh with a mutilated or S-type beveled gear 41 fixed on the operating shaft 20.

Encircling the shaft 37 with one end acting upon the bracket portion 35 and its opposite end acting upon the bevel gear 40 is an expansion cushioning coil spring 42 which normally urges the pinion 38 into engagement with the forward end of the bearing sleeve 36 and the beveled gear 40 into meshing relation with the mutilated gear 41.

Figure 4:
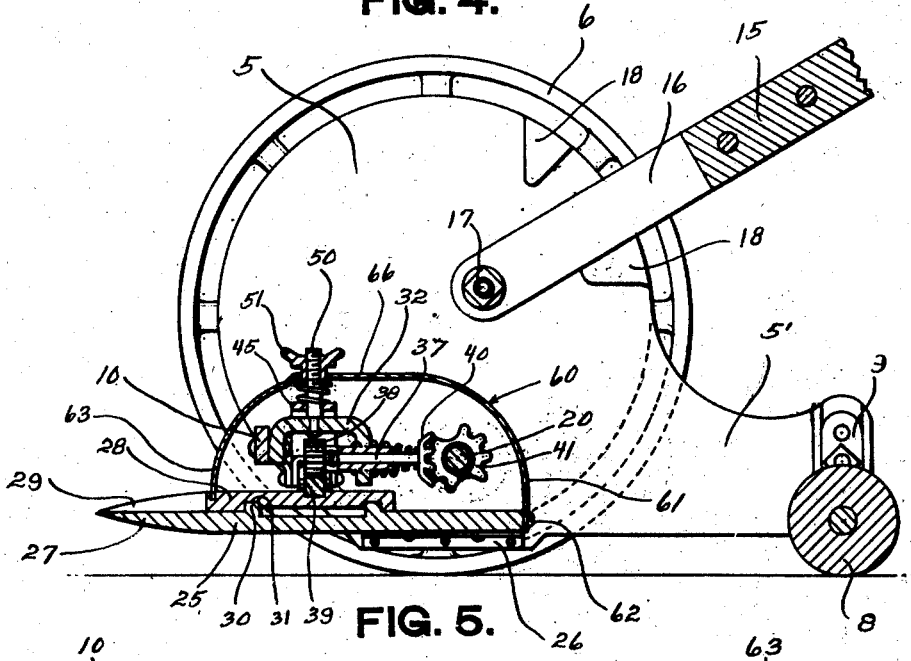
Figure 4 is an enlarged section on the line 4—4 of Figure 1.
Figure 5:
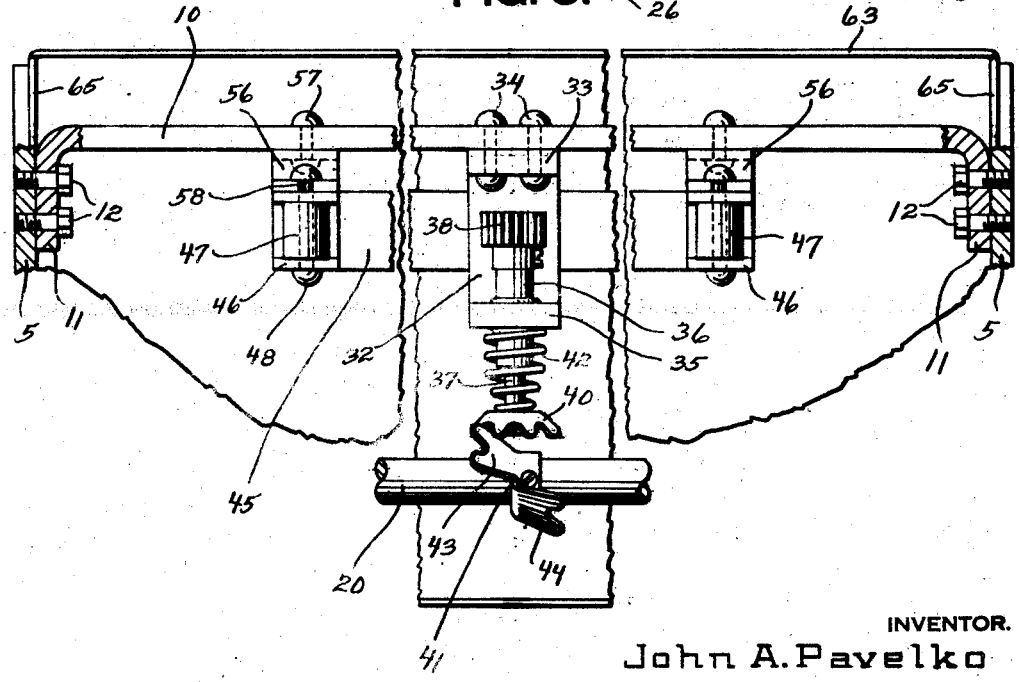
Figure 5 is an enlarged fragmentary bottom plan view showing the driving arrangement and arrangement of tensioning means for the cutter plate.

As will be observed particularly in Figure 5, the mutilated gear 41 is formed with gear segments 43 and 44 which oppositely act upon the gear 40 for first imparting rotation in one direction and then in another direction to the shaft 37. These gear segments extend for substantially one-half the circumference of the mutilated gear as shown in Figure 4 with an even number of teeth on each gear segment. Thus it will be seen that with a continuous rotation of the shaft 20 in one direction, the gearing arrangement interposed between this shaft and the pinion 38 will impart a reciprocatory movement to the cutter plate 28.

The coil spring 42 acts to absorb shock when the gear 40 meshes with either of the gear segments 43 and 44, by allowing the shaft 37 to be shifted axially. This shifting of the shaft 37 will also occur should clogging of the knives 27 and 29 occur.

Figure 3:
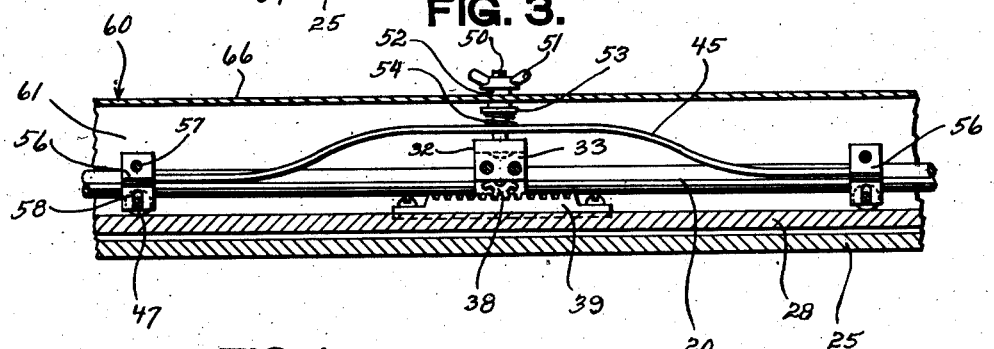
Figure 3 is an enlarged fragmentary detail view on the line 3—3 of Figure 1.

A tensioning means is provided for normally forcing the cutter plate 28 into sliding engagement with the cutter plate 25 and this tensioning means embodies an elongated pressure bar or strip 45 extended longitudinally above the cutter plate 28 and arched upwardly midway its ends as clearly shown in Figure 3. This arched intermediate portion of the pressure bar extends across the bearing bracket 32. Secured to each end of the bar 45 and at the under side thereof is a U-shaped holder 46 having journaled between the downturned flanges thereof a bearing roller 47 as upon suitable pins 48. These rollers 47 have rolling contact with the flat upper surface of the cutter plate 28 at opposite sides of the rack 39. These bearing rollers 47 engage the plate 28 at the rear of the tie bar 10 and preferably midway between the guide ribs 30.

Secured at its lower end to the bearing bracket 32 directly above the pinion 38 is a tensioning bolt or pin 50 having a threaded upper end portion. This pin 50 extends upwardly through an opening provided in the pressure bar 45 midway the ends thereof so that the central portion of the bar has free vertical movement along the lower portion of the pin. Threaded upon the upper end of the pin 50 is a wing nut 51 having a sleeve portion 52 below the wings of the nut. A washer 53 encircles the pin 50 below the sleeve 52 and an expansion coil spring 54 encircles the pin between the washer 53 and bar 45. Threading of the nut 51 on the pin 50 will vary the tension of the spring 54 and thus vary the bearing pressure of the rollers 47 upon the cutter plate 28.

Guide brackets 56 are provided for retaining the pressure bar or strip 45 longitudinally of the tie bar 10 and these guide brackets or plates are secured to the tie bar at their upper ends as by rivets or the like 57. The rearwardly offset lower ends of these guide plates are slotted as at 58 for slidably receiving the roller mounting pins 48. With this arrangement the pressure bar 45 is held against rotation about the tensioning pin 50 as an axis.

When cutting thick or coarse grass, the tensioning bolt 51 is rotated for relieving tension on the spring 54 so that pressure on the cutter plate 28 is released and clogging of the cutting knives is prevented.

The entire operating mechanism for the reciprocating cutter plate 28 is fully enclosed in an arched or channel-shaped cover 60 which is relatively shallow compared to the height of the ground wheels 6. This cover 60 has its downturned rear wall 61 secured to the rear edge of the lower or stationary cutter plate 25 as by suitable fastening elements 62. The ends of the cover abut with the inner surfaces of the side plates 5 and the downturned front wall 63 of the cover extends into a groove 64 provided in the upper side of the cutter plate 28 just rearwardly of the knives 29. The cover is provided at each end of the front wall 63 with a substantially triangular-shaped end wall portion 65 having a straight lower edge and a concaved upper edge conforming to the curvature of the side plates 5, so that the gearing or driving chamber is fully enclosed at its ends. The cover walls 61 and 63 are rounded into a substantially flat top wall 66 and this top wall is provided with a circular opening for receiving the sleeve portion 52 of the tensioning nut 51. With this arrangement, pressure upon the cutter plate 28 may be varied without requiring removal of the cover 60.

With the specific gearing arrangement as shown it will be noted that an extremely shallow cover will fully enclose the gearing and this shallow cover will permit the cut grass to readily pass over the cover without dropping or piling up at the front of the cover.

From the foregoing it will be apparent that a novel and improved form of construction for lawn mowers has been disclosed wherein the cutting is performed by a reciprocating cutter plate operated in a novel manner from the ground wheels of the mower. It will also be apparent that a compact gearing arrangement has been provided which is fully enclosed by a shallow cover over which the cut grass may fall. It will further be apparent that a novel arrangement has been disclosed for preventing injury to the gearing upon clogging of the cutting knives, and an arrangement whereby the mower may cut close to walls, flower beds and the like and thus prevent hand clipping of the grass.

Changes in detail may be made to the form of invention herein shown and described, without departing from the spirit of the invention or the scope of the following claims.

I claim:

1. In a lawn mower, a frame including a pair of side plates, a ground wheel journaled in each side plate, a lower cutter plate connected between the side plates, an upper cutter plate reciprocable on the lower cutter plate, a driving shaft rotated by the ground wheels, drive gearing between the driving shaft and upper cutter plate for imparting reciprocatory movement thereto and embodying yieldable throw-out means operable upon clogging of the cutter plates.

2. In a lawn mower, a frame including a pair of side plates, a ground wheel journaled on each side plate, a lower cutter plate connected between the side plates at the lower edges thereof, an upper cutter plate reciprocable on the lower cutter plate, an operating shaft journaled in the lower portion of the side plates, drive gearing between the operating shaft and upper cutter plate for imparting reciprocatory movement to the upper cutter plate, tensioning means for the upper cutter plate for normally urging the upper plate upon the lower cutter plate, and a shallow cover enclosing the operating shaft, drive gearing and tensioning means and disposed below the axis of the ground wheels.

3. In a lawn mower, a frame including a pair of side plates, a ground wheel journaled on each side plate and each having an internal gear, an operating shaft journaled at its ends in the side plates, a pinion on each end of the shaft and meshing with said internal gears, a pawl and ratchet connection between the pinions and shaft for causing rotation of the shaft in one direction only, a lower cutter plate connected at its ends to the side plates, an upper cutter plate reciprocable on the lower cutter plate, tensioning means for the upper cutter plate, and gearing interposed between the operating shaft and upper cutter plate for reciprocating the upper cutter plate upon rotation of the operating shaft by the ground wheels.

4. In a lawn mower, a frame including a pair of side plates, a ground wheel journaled in each side plate, an operating shaft journaled in the side plates and rotatable by the ground wheels, a lower cutter plate connecting the side plates, an upper cutter plate reciprocable on the lower cutter plate, a rack on the upper cutter plate, a driven shaft journaled on an axis at a right angle to the operating shaft, a pinion on one end of the driven shaft meshing with said rack, a gear on the opposite end of the driven shaft, and a mutilated gear on the operating shaft having gear segments alternately engageable with said gear on the driven shaft for imparting rotation thereto first in one direction and then in an opposite direction.

5. In a lawn mower, a frame including a pair of side plates, a ground wheel journaled on each side plate, an operating shaft journaled in the side plates and rotatable by the ground wheels, a lower cutter plate connecting the side plates, an upper cutter plate reciprocable on the lower cutter plate, a rack on the upper cutter plate, a driven shaft journaled on an axis at a right angle to the operating shaft, a pinion on one end of the driven shaft meshing with said rack, a gear on the opposite end of the driven shaft, a mutilated gear on the operating shaft having even gear segments alternately engageable with the gear on the driven shaft for reversely rotating the same, and means yieldably urging the gear on the driven shaft into engagement with the gear segments of the mutilated gear.

6. In a lawn mower, a frame including a pair of side plates, a ground wheel journaled on each side plate, an operating shaft journaled in the lower portions of the side plates and rotatable from the ground wheels, a stationary cutter plate connected between the lower edges of the side plates below said shaft, a reciprocating cutter plate slidably guided on the stationary cutter plate, a rack on the reciprocating cutter plate, a driven shaft journaled at a right angle to the operating shaft and being axially movable, a pinion on one end of the shaft for meshing with said rack and limiting movement of the driven shaft toward the operating shaft, a bevel gear on the opposite end of the driven shaft, a mutilated gear on the operating shaft having oppositely arranged gear segments alternately engageable with said bevel gear, and a coil spring yieldably urging the driven shaft toward the operating shaft and permitting disengagement of the bevel gear with the gear segments.

7. In a lawn mower, a frame including a pair of side plates, a ground wheel journaled on said side plates, an operating shaft journaled in the side plates and rotatable from the ground wheels, a lower cutter plate connected between the side plates, an upper cutter plate reciprocable on the lower cutter plate, a rack on the upper cutter plate, a bearing bracket mounted above the rack, a driven shaft journaled in the bracket at a right angle to the operating shaft, a pinion on one end of the driven shaft meshing with said rack, a bevel gear on the opposite end of the driven shaft, a mutilated gear on the operating shaft having gear segments alternately engageable with said bevel gear, and tensioning means for the upper cutter plate embodying a pressure bar having bearing rollers engageable with the upper cutter plate beyond each end of said rack.

8. In a lawn mower, a frame including a pair of side plates, a ground wheel journaled on said side plates, an operating shaft journaled in the side plates and rotatable from the ground wheels, a lower cutter plate connected between the side plates, an upper cutter plate reciprocable on the lower cutter plate, a rack on the upper cutter plate, a bearing bracket mounted above the rack, a driven shaft journaled in the bracket at a right angle to the operating shaft, a pinion on one end of the driven shaft meshing with said rack, a bevel gear on the opposite end of the driven shaft, a mutilated gear on the operating shaft having gear segments alternately engageable with said bevel gear, a shallow cover enclosing the driving mechanism and having its ends abutting the side plates, a pressure bar straddling said bracket, a roller at each end of the bar for rolling engagement with the upper cutter plate, and adjustable spring urged tensioning means for said pressure bar for varying the pressure of said rollers upon the upper cutter plate.

9. In a lawn mower, a frame including a pair of side plates, a ground wheel journaled on each side plate, an operating shaft journaled in the side plates and driven by said ground wheels, a lower cutter plate connected between the side plates at the lower edges thereof, an upper cutter plate reciprocable on the lower cutter plate, gearing interposed between the operating shaft and the upper cutter plate for imparting a reciprocatory movement thereto, a shallow cover enclosing the gearing and having a downturned front wall engaging in a groove in the upper side of the upper cutter plate, and tensioning means for the upper cutter plate embodying a tensioning bolt projecting upwardly through said cover and having a nut threaded thereon to be rotated from above the cover.

10. In a lawn mower, a frame including a pair of side plates, a ground wheel journaled on each side plate, an operating shaft journaled in the lower portion of the side plates and driven by the ground wheels, a tie bar connecting the side plates forwardly of the operating shaft, a lower cutter plate connecting the side plates below the operating shaft and tie bar, an upper cutter plate reciprocable on the lower cutter plate, a bearing bracket supported at the intermediate portion of the tie bar and projecting rearwardly therefrom, drive gearing between the operating shaft and upper cutter plate and including a driven shaft rotatable in said bracket, a pressure bar arched above the bracket, a roller journaled in each end of the pressure bar for rolling contact with the upper cutter plate, guide brackets for the ends of the pressure bar, a tensioning bolt secured at its lower end to the bearing bracket and projecting upwardly through the central portion of the pressure bar, a tensioning nut threaded on the upper end of the bolt, and an expansion coil spring encircling the bolt between the nut and pressure bar.

11. In a lawn mower, a frame, ground wheels supporting the frame, a lower cutter plate fixed on the frame, an upper cutter plate reciprocable on the lower cutter plate, gearing for imparting a reciprocatory movement to the upper cutter plate from the ground wheels, a shallow cover enclosing the gearing, and pressure adjusting means for the upper cutter plate embodying an adjusting nut projecting above said cover.

12. A lawn mower comprising a frame embodying a pair of side plates each having a rearward extension, a ground wheel journaled on each side plate at the outer side thereof, a cutting unit mounted between the side plates and embodying a reciprocable cutter plate operable from said ground wheels, said cutter unit being disposed wholly below the axis of the ground wheels, a handle connected to the side plates to project rearwardly therefrom, and an adjustable roller mounted between the rearward extension of the side plates.

JOHN ANDREW PAVELKO.